US012597553B2

(12) United States Patent
Muneuchi

(10) Patent No.: US 12,597,553 B2
(45) Date of Patent: Apr. 7, 2026

(54) MANUFACTURING METHOD OF SURFACE-MOUNT INDUCTOR

(71) Applicant: Murata Manufacturing Co., Ltd., Kyoto-fu (JP)

(72) Inventor: Keita Muneuchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 739 days.

(21) Appl. No.: 17/820,196

(22) Filed: Aug. 16, 2022

(65) Prior Publication Data

US 2022/0392694 A1 Dec. 8, 2022

Related U.S. Application Data

(60) Division of application No. 16/019,399, filed on Jun. 26, 2018, now Pat. No. 11,456,114, which is a (Continued)

(30) Foreign Application Priority Data

Dec. 28, 2015 (JP) ................................ 2015-256012

(51) Int. Cl.
*H01F 7/06* (2006.01)
*H01F 17/04* (2006.01)
(Continued)

(52) U.S. Cl.
CPC .......... *H01F 27/292* (2013.01); *H01F 17/04* (2013.01); *H01F 27/2823* (2013.01); (Continued)

(58) Field of Classification Search
CPC ............ H01F 27/2823; H01F 27/2828; H01F 27/292; H01F 41/0246; H01F 41/10; H01F 17/04; H01F 2017/048
See application file for complete search history.

(56) References Cited

U.S. PATENT DOCUMENTS 9,253,880 B2 * 2/2016 Park .................... H05K 3/4038
2003/0206089 A1 11/2003 Shikama et al.
(Continued)

FOREIGN PATENT DOCUMENTS

JP 2001-052937 A 2/2001
JP 2005-116708 A 4/2005
(Continued)

OTHER PUBLICATIONS

International Search Report issued in PCT/JP2016/085626; mailed Feb. 21, 2017.
(Continued)

*Primary Examiner* — Paul D Kim
(74) *Attorney, Agent, or Firm* — Studebaker Brackett PLLC

(57) ABSTRACT

A surface-mount inductor comprises a molded body containing a metal magnetic powder; at least one coil buried in the molded body such that lead-out end parts at both ends of the coil are at least partially exposed on a surface of the molded body; and an external terminal formed over an exposed surface of each of the lead-out end parts. A metal magnetic powder exposed portion is formed at least around the exposed surface. The external terminal at least includes a first plating layer formed over the metal magnetic powder exposed portion and the exposed surface of the lead-out end part, and a conductive paste layer formed on the first plating layer and made of a solidified conductive paste. Consequently, the surface mount inductor comprises an external terminal having high connection reliability.

12 Claims, 13 Drawing Sheets

Related U.S. Application Data continuation of application No. PCT/JP2016/085626, filed on Nov. 30, 2016.

(51) Int. Cl.

| | |
|---|---|
| ***H01F 27/28*** | (2006.01) |
| ***H01F 27/29*** | (2006.01) |
| ***H01F 41/02*** | (2006.01) |
| ***H01F 41/10*** | (2006.01) |

(52) U.S. Cl.

CPC ..... *H01F 27/2828* (2013.01); *H01F 41/0246* (2013.01); *H01F 41/10* (2013.01); *H01F 2017/048* (2013.01)

(56) References Cited

U.S. PATENT DOCUMENTS

| | | | | |
|---|---|---|---|---|
| 2010/0271752 | A1* | 10/2010 | Ishida | H01G 4/012 361/306.3 |
| 2011/0043317 | A1* | 2/2011 | Ikriannikov | H01F 27/292 336/192 |
| 2013/0255071 | A1 | 10/2013 | Muneuchi et al. | |
| 2013/0307655 | A1 | 11/2013 | Saito et al. | |
| 2014/0062640 | A1* | 3/2014 | Sasamori | H01F 17/04 336/175 |
| 2014/0338185 | A1* | 11/2014 | Muneuchi | H01F 41/063 29/605 |
| 2015/0099115 | A1 | 4/2015 | Maeda et al. | |

FOREIGN PATENT DOCUMENTS

| | | | |
|---|---|---|---|
| JP | 2013-211333 | A | 10/2013 |
| JP | 2014-225590 | A | 12/2014 |
| JP | 2016-058418 | A | 4/2016 |
| KR | 10-2001-0067075 | A | 7/2001 |
| KR | 10-2013-0139993 | A | 12/2013 |
| KR | 10-2014-0135644 | A | 11/2014 |
| WO | 2012/105489 | A1 | 8/2012 |

OTHER PUBLICATIONS

International Preliminary Report On Patentability and Written Opinion Issued in PCT/JP2016/085626; issued Jul. 3, 2018.

An Office Action mailed by the Korean Patent Office on Jul. 22, 2019, which corresponds to Korean Patent Application 10-2018-7018016 and is related to U.S. Appl. No. 16/019,399.

* cited by examiner

MANUFACTURING METHOD OF SURFACE-MOUNT INDUCTOR

CROSS-REFERENCE TO RELATED APPLICATIONS

This application is a Divisional of U.S. patent application Ser. No. 16/019,399 filled on Jun. 26, 2018, now U.S. Pat. No. 11,456,114, which claims benefit of priority to International Patent Application No. PCT/JP2016/085626, filed Nov. 30, 2016, and to Japanese Patent Application No. 2015-256012, filed Dec. 28, 2015, the entire contents of each are incorporated herein by reference.

BACKGROUND

Technical Field

The present disclosure relates to a surface-mount inductor and a manufacturing method thereof and, more particularly, to a surface-mount inductor having at least one coil buried in a molded body containing a metal magnetic powder and a manufacturing method thereof.

Background Art

For example, a conventional surface-mount inductor having a structure shown in FIG. 20 is known. The surface-mount inductor has a coil 261 formed by winding a conductive wire and buried in a molded body 262 formed of a sealing material containing a resin and a magnetic powder, and a pair of lead-out end parts 261*b*, 261*b* of the coil 261 is connected to a pair of external terminals 264, 264 formed on the surface of the molded body 262, as described, for example, in Japanese Laid-Open Patent Publication No. 2005-116708.

This surface-mount inductor is manufactured by forming the molded body 262 having the coil 261 built-in with a compression molding method or a powder compacting method and by applying a conductive paste to the molded body to form the external terminals 264. The conductive paste used is a paste acquired by dispersing metal particles of Ag etc. in a thermosetting resin such as epoxy resin. This conductive paste is made conductive by bringing metal particles dispersed in the resin into contact with each other, or with a conductive wire, by utilizing a contraction stress due to curing of the thermosetting resin.

However, the conventional surface-mount inductor has a problem of high initial resistance and unstable bonding between a conductive wire and an external terminal due to weak bonding between the conductive wire and the external terminal. In this regard, it is proposed to form an external terminal by using a conductive paste containing metal fine particles with a particle diameter smaller than 100 nm as described, for example, in Japanese Laid-Open Patent Publication No. 2013-211333.

SUMMARY

A method using a conductive paste containing metal fine particles having a particle diameter smaller than 100 nm as in Japanese Laid-Open Patent Publication No. 2013-211333 can improve initial resistance of a bonding portion since the metal fine particles constituting the conductive paste are sintered at a low temperature. However, since a bonding strength between the molded body and the external terminal is weak, the method has a problem that the external terminal easily peels off from the molded body due to thermal shock. Furthermore, since the conductive paste containing metal fine particles with minute particle diameter is expensive, the method also has a problem of increased manufacturing costs.

To solve such problems, the present inventor has proposed to remove the resin on the surface of the molded body to expose the metal magnetic powder on the surface of the molded body and to perform plating on a portion with the exposed metal magnetic powder so as to form an L-shaped external terminal (Japanese Patent Application No. 2014-180928).

However, the needs still exit for a surface-mount inductor having a stronger bonding strength between the molded body and the external terminal and a high connection reliability.

Therefore, the present disclosure provides a surface-mount inductor having external terminals with high connection reliability and a manufacturing method thereof.

A surface-mount inductor according to an embodiment of the present disclosure comprises a molded body containing a metal magnetic powder; at least one coil buried in the molded body such that lead-out end parts at both ends of the coil are at least partially exposed on a surface of the molded body; and an external terminal formed over an exposed surface of each of the lead-out end parts and a metal magnetic powder exposed portion formed at least around the exposed surface. The external terminal at least includes a first plating layer formed over the metal magnetic powder exposed portion and the exposed surface of the lead-out end part and a conductive paste layer formed on the first plating layer and made of a solidified conductive paste.

Another aspect of the present disclosure provides a manufacturing method of a surface-mount inductor having at least one coil buried in a molded body containing a metal magnetic powder, the method comprising a molding step of placing the at least one coil in a molding die and filling a material for a molded body into the molding die to obtain the molded body, wherein the coil is buried in the molded body such that lead-out end parts at both ends of the coil are at least partially exposed on a surface of the molded body; and a step of forming an external terminal over an exposed surface of each of the lead-out end parts and a metal magnetic powder exposed portion formed at least around the exposed surface. The step of forming an external terminal at least includes a step of forming a first plating layer over the metal magnetic powder exposed portion and the exposed surface of the lead-out end part and a step of forming a conductive paste layer made of a solidified conductive paste on the first plating layer.

According to the present disclosure, the surface-mount inductor having the external terminals with high connection reliability and the manufacturing method thereof can be provided.

DETAILED DESCRIPTION

Figure 1:
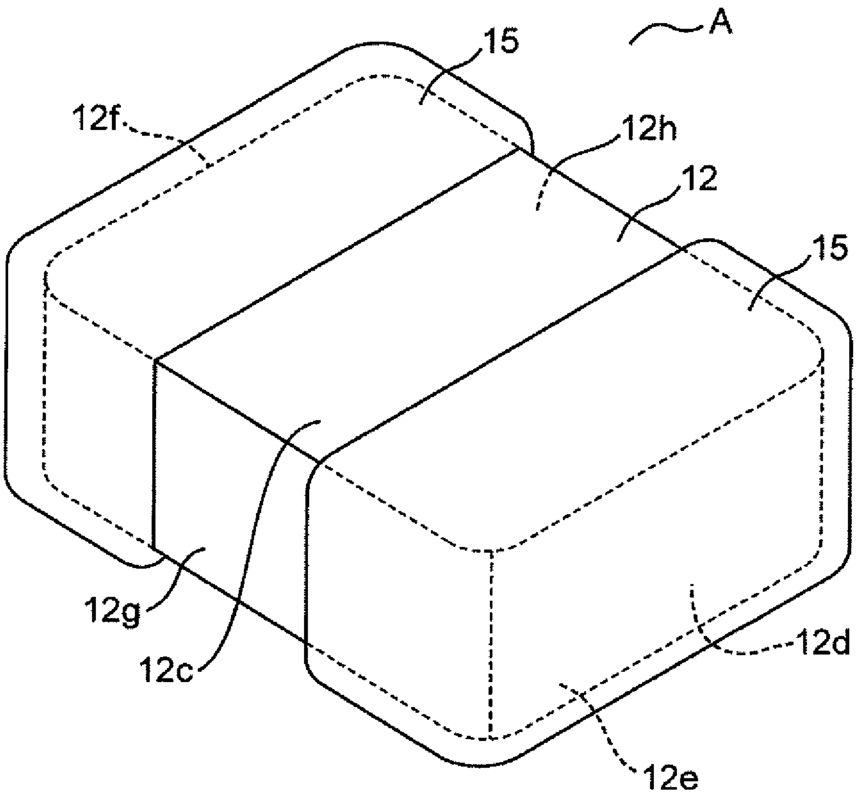
FIG. 1 is a transparent schematic perspective view of a surface-mount inductor according to a first embodiment of the present disclosure.

Embodiments of the present disclosure will now be described with reference to the drawings etc. In the following drawings, the same members used are denoted by the same reference numerals and will not repeatedly be described or will be described in a simplified manner in some cases.

First Embodiment

A surface-mount inductor according to this embodiment is characterized by comprising a molded body containing a metal magnetic powder, at least one coil buried in the molded body such that lead-out end parts at both ends of the coil are at least partially exposed on a surface of the molded body, and an external terminal formed over an exposed surface of each of the lead-out end parts and a metal magnetic powder exposed portion formed at least around the exposed surface. The external terminal at least includes a first plating layer formed over the metal magnetic powder exposed portion and the exposed surface of the lead-out end part and a conductive paste layer formed on the first plating layer and made of a solidified conductive paste.

Figure 2:
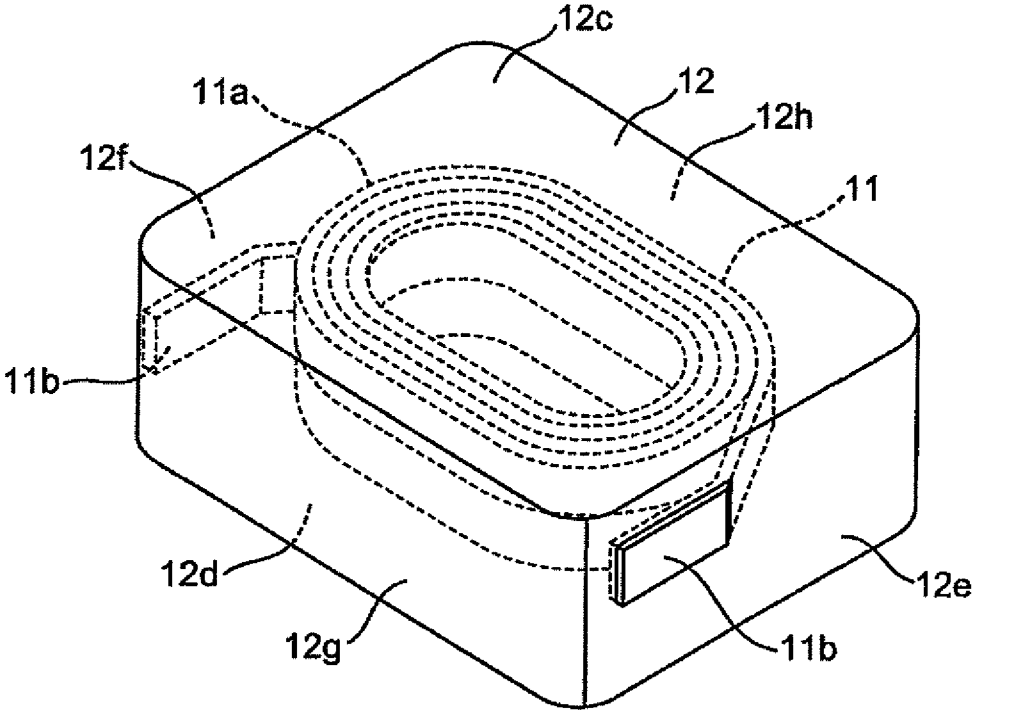
FIG. 2 is a transparent schematic perspective view at a manufacturing step of the surface-mount inductor according to the first embodiment of the present disclosure.

An example of a structure of a surface-mount inductor A according to this embodiment will be described with reference to FIGS. 1 and 2. FIG. 1 is a transparent schematic perspective view of a structure inside the surface-mount inductor A. The surface-mount inductor A has a molded body 12 having a substantially rectangular parallelepiped shape and external terminals 15, 15 formed at both ends thereof. The molded body 12 has an upper surface 12*c* and a bottom surface 12*d* opposite to each other and four side surfaces 12*e*, 12*f*, 12*g*, 12*h* adjacent to the upper surface 12*c* and the bottom surface 12*d*. FIG. 2 is a transparent schematic perspective view of a structure of the molded body 12, showing a state before forming the external terminals of FIG. 1. One coil 11 formed by winding a conductive wire is buried in the molded body 12. The coil 11 is a coil including a winding part 11*a* formed by a so-called "outside-to-outside winding" in which a conductive wire is wound such that both ends are arranged in directions opposite to each other along an outer circumferential surface of the coil, and a pair of lead-out end parts 11*b*, 11*b* disposed at both ends of the winding part 11*a* and made up of non-winding portions. FIG. 2 shows an example of two-tier outside-to-outside winding. The paired lead-out end parts 11*b*, 11*b* of the coil 11 are respectively exposed on the first side surface 12*e* and the second side surface 12*f* opposite to each other arranged in the length direction of the molded body 12. A plating layer described later is formed entirely on each of the first side surface 12*e* and the second side surface 12*f* including the exposed surfaces of the lead-out end parts 11*b*, 11*b*. Additionally, on the plating layers, a pair of conductive paste layers 14, 14 made of a solidified conductive paste is formed to cover five surfaces at both ends of the molded body 12, or in other words, to cover the five surfaces at one end, i.e., the first side surface 12*e* as well as the upper surface 12*c*, the bottom surface 12*d*, and the third side surface 12*g* and the fourth side surface 12*h* opposite to each other, which are in direct contact with the first side surface 12*e*, and cover the five surfaces at the other end, i.e., the second side surface 12*f* as well as the upper surface 12*c*, the bottom surface 12*d*, and the third side surface 12*g* and the fourth side surface 12*h* opposite to each other, which are in direct contact with the second side surface 12*f*. The lead-out end parts 11*b*, 11*b* at both ends of the coil 11 are respectively connected to the pair of the conductive paste layers 14, 14 via the plating layers. The plating layers and the conductive paste layers constitute the external terminals 15, 15. The first and second side surfaces opposite to each other in the molded body mean opposite side surfaces with which a straight line connecting the lead-out end parts at both ends of the coil intersects. In FIG. 2, the side surfaces correspond to the first side surface 12*e* and second side surface 12*f* opposite to each other arranged in the length direction of the molded body 12.

In FIG. 2, a coil having an elliptical shape in a top view is shown; however, the coil is not limited thereto and may have a circular shape or a substantially rectangular shape in a top view. Although the lead-out end parts 11*b*, 11*b* are respectively exposed on the first side surface 12*e* and the second side surface 12*f*, the exposed area is not particularly limited as long as electric connection to the external terminals can be formed. The lead-out end parts may project from the first side surface and the second side surface to the extent that the formation of the plating layers formed thereon is not hindered.

The molded body contains the metal magnetic powder and a binder resin as well as additives such as a moldability improving agent and a releasing agent as needed. Examples of the metal magnetic powder can include iron-based metal magnetic powders of Fe, Fe—Si—Cr, Fe—Si—Al, Fe—Ni—Al, Fe—Cr—Al, etc., metal magnetic powders of amorphous etc., metal magnetic material powders with surfaces covered with an insulator such as glass, and metal magnetic material powders with modified surfaces. Examples of the binder resin can include thermosetting resins such as epoxy resin, polyimide resin, and phenol resin, and thermoplastic resins such as polyethylene resin and polyamide resin. Although FIG. 2 shows the case of the molded body having a rectangular parallelepiped shape, the molded body may have another rectangular shape, for example, a cube shape.

The surface-mount inductor A can be manufactured by using the following manufacturing method, for example Specifically, the manufacturing method is a manufacturing method of a surface-mount inductor having at least one coil buried in a molded body containing a metal magnetic powder and comprises a molding step of placing the at least one coil in a molding die and filling a material for a molded body into the molding die to obtain the molded body, with the coil being buried in the molded body such that lead-out end parts at both ends of the coil are at least partially exposed on a surface of the molded body. The manufacturing method further comprises a step of forming an external terminal over an exposed surface of each of the lead-out end parts and a metal magnetic powder exposed portion formed at least around the exposed surface. The step of forming an external terminal at least includes a step of forming a first plating layer over the metal magnetic powder exposed portion and the exposed surface of the lead-out end part, and a step of forming a conductive paste layer made of a solidified conductive paste on the first plating layer. The manufacturing method will hereinafter be described with reference to FIGS. 1 to 5.

(Molding Step)

This step is a molding step of placing at least one coil in a molding die and filling a material for a molded body into the molding die to obtain the molded body having a rectangular parallelepiped shape with upper and bottom surfaces opposite to each other and four side surfaces, and the coil is buried in the molded body such that the lead-out end parts at both ends of the coil are at least partially exposed respectively on first and second side surfaces opposite to each other.

First, after the winding part 11*a* is formed by spirally winding a conductive wire having a rectangular cross section with insulating coating in outside-to-outside manner in two tiers such that both ends thereof are located on the outer circumference, both ends of the conductive wire are led out from the outer circumference of the winding part in the opposite directions to form the lead-out end parts 11*b*, 11*b* at both ends so that the coil 11 is formed. A resin used for the insulating coating is preferably a resin having a high heat resistance temperature and may be a polyamide-based resin, a polyester-based resin, an imide-modified polyurethane resin, etc. The conductive wire may be not only a rectangular conductive wire having a rectangular cross section but also a round wire or a wire having a polygonal cross section.

Subsequently, by using a magnetic material, for example, an iron-based metal magnetic powder of Fe, Fe—Si—Cr, Fe—Si—Al, Fe—Ni—Al, Fe—Cr—Al, etc. or a metal magnetic powder of amorphous etc., and a binder resin, for example, an epoxy resin, a sealing material (material for a molded body) is manufactured by granulating a mixture thereof into a powdered state. The coil 11 is then placed in a predetermined molding die, and the material for a molded body is filled in the mold and is subjected to compression molding. By placing the coil in the die such that the lead-out end parts at both ends of the coil are at least partially exposed respectively on the first and second side surfaces opposite to each other on the molded body, the molded body 12 can be molded such that the lead-out end parts at both ends of the coil are at least partially exposed respectively on the first and second side surfaces opposite to each other on the molded body. The molding method is not limited to the compression molding method, and a powder compacting method is also usable.

(Step of Forming Metal Magnetic Powder Exposed Portion and External Terminal)

Figure 3:
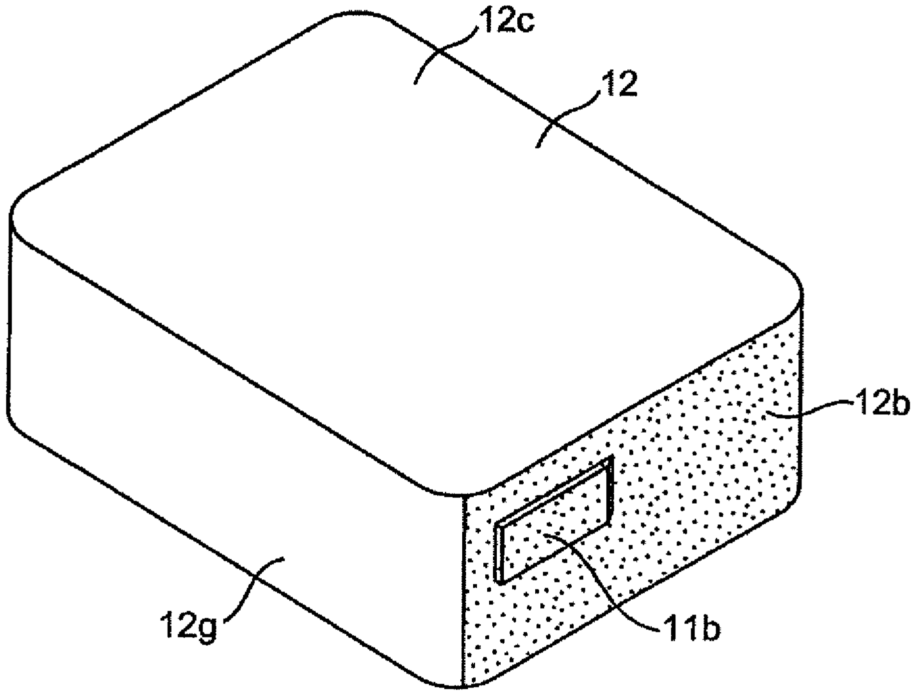
FIG. 3 is a schematic perspective view at a manufacturing step of the surface-mount inductor according to the first embodiment of the present disclosure.

Films on the surfaces of the lead-out end parts 11*b*, 11*b* at both ends of the coil 11 are removed by mechanical peeling. Subsequently, as shown in FIG. 3, resin components present on the surfaces of the first side surface 12*e* and the second side surface 12*f* opposite to each other on the molded body 12 are removed by using laser irradiation, blasting treatment, polishing, etc. As a result, on the first side surface 12*e* and the second side surface 12*f* other than the exposed surfaces of the lead-out end parts 11*b*, 11*b* at both ends, a metal magnetic powder exposed portion 12*b* is formed such that the metal magnetic powder constituting the molded body 12 is exposed. FIG. 3 shows an example of the metal magnetic powder exposed portion 12*b* formed entirely on the first side surface 12*e* and the second side surface 12*f*; however, the metal magnetic material powder exposed portion 12*b* may be formed at least around the exposed surfaces of the lead-out end parts 11*b*, 11*b* at both ends.

Figure 4:
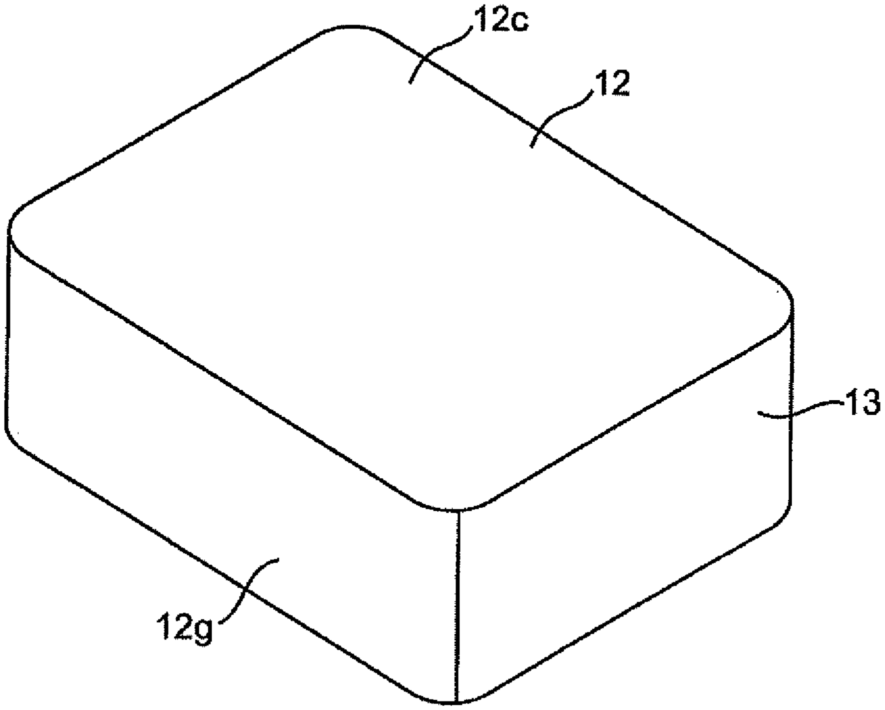
FIG. 4 is a schematic perspective view at a manufacturing step of the surface-mount inductor according to the first embodiment of the present disclosure.

Subsequently, a plating process is performed on the exposed surfaces of the lead-out end parts 11*b*, 11*b* at both ends and the metal magnetic powder exposed portion 12*b* to form a plating layer 13 as shown in FIG. 4. The plating layer 13 is formed entirely over the first side surface 12*e* and the second side surface 12*f*. As a result, the lead-out end parts 11*b*, 11*b* are connected to the plating layer 13. A conductive material used for the plating process is not particularly limited as long as the material is a metal usable for plating. For example, a material containing at least one metal material selected from the group consisting of Cu, Ni, and Sn can be used.

Figure 5:
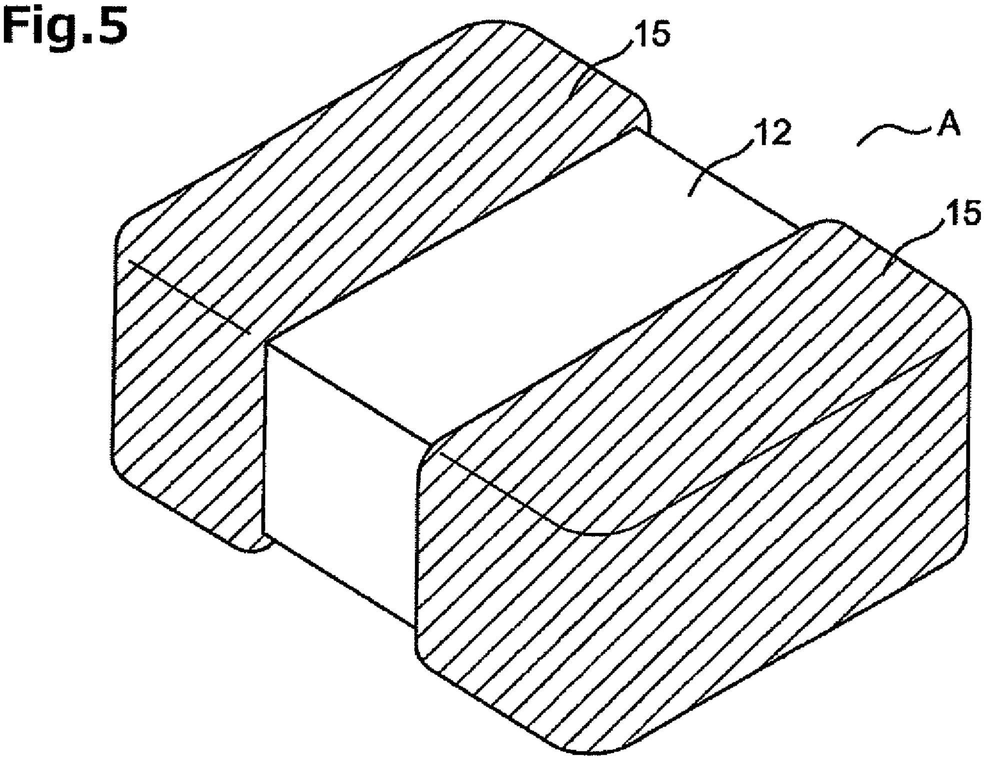
FIG. 5 is a schematic perspective view of the surface-mount inductor according to the first embodiment of the present disclosure.

Subsequently, a conductive paste is applied over the first side surface 12*e* and the four surfaces adjacent to the first side surface 12*e*, i.e., the upper surface 12*c*, the bottom surface 12*d*, the third side surface 12*g*, and the fourth side surface 12*h*. The conductive paste is also applied over the second side surface 12*f* and the four surfaces adjacent to the second side surface 12*f*, i.e., the upper surface 12*c*, the bottom surface 12*d*, the third side surface 12*e*, and the fourth side surface 12*f*. Subsequently, a heat treatment is performed to dry and solidify the conductive paste to form the conductive paste layers 14, 14, so that the external terminals 15, 15 are formed. As a result, the surface-mount inductor A shown in the schematic perspective view of FIG. 5 is obtained. The conductive paste can be a paste acquired by dispersing metal particles of Au, Ag, etc. in a thermosetting resin such as an epoxy resin.

Figure 6:
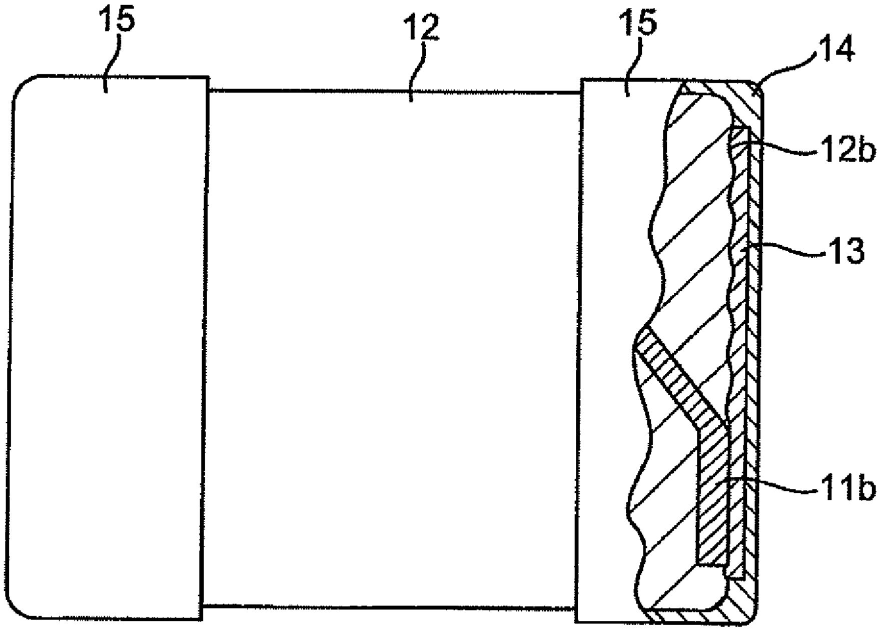
FIG. 6 is a partially cutaway schematic cross-sectional view of the surface-mount inductor according to the first embodiment of the present disclosure.

FIG. 6 is a partially cutaway schematic cross-sectional view of the obtained surface-mount inductor A. The surface of the lead-out end part 11*b* is exposed on the first side surface 12*e*. The plating layer 13 is formed to cover the surface of the lead-out end part 11*b* and the metal magnetic material powder exposed portion 12*b*. The plating layer 13 is further covered with the conductive paste layer 14. The external terminal 15 is made up of the plating layer 13 and the conductive paste layer 14.

According to this embodiment, since the metal magnetic material powder exposed portion is formed at least around the exposed surface of the lead-out end part of the coil, the plating is facilitated on the metal magnetic material powder exposed portion, so that the lead-out end part and the plating layer can firmly be bonded. Additionally, since the bonding area between the conductive paste layer and the lead-out end part can be increased via the plating layer, the bonding strength can be increased not only between the lead-out end part and the external terminal but also between the molded body and the external terminal, so that the external terminal can be prevented from peeling off due to thermal shock or physical stress. Therefore, the surface-mount inductor having the external terminals with high connection reliability can be provided. Moreover, when the external terminals are formed, the metal magnetic powder may be exposed only on the side surfaces on which the lead-out end parts of the coil are exposed, so that the workability of the external terminals can be improved as compared to a method in which the metal magnetic powder on another surface must be exposed, for example, when the external terminals are L-shaped.

Second Embodiment

A surface-mount inductor according to this embodiment has the same structure as the first embodiment except that the metal magnetic powder is exposed only around the exposed surfaces of the lead-out end parts on the side surfaces on which the lead-out end parts of the coil are exposed. Description will be made with reference to FIGS. 7 to 9, and the portions common to the surface-mount inductor of the first embodiment will not be described.

Figure 7:
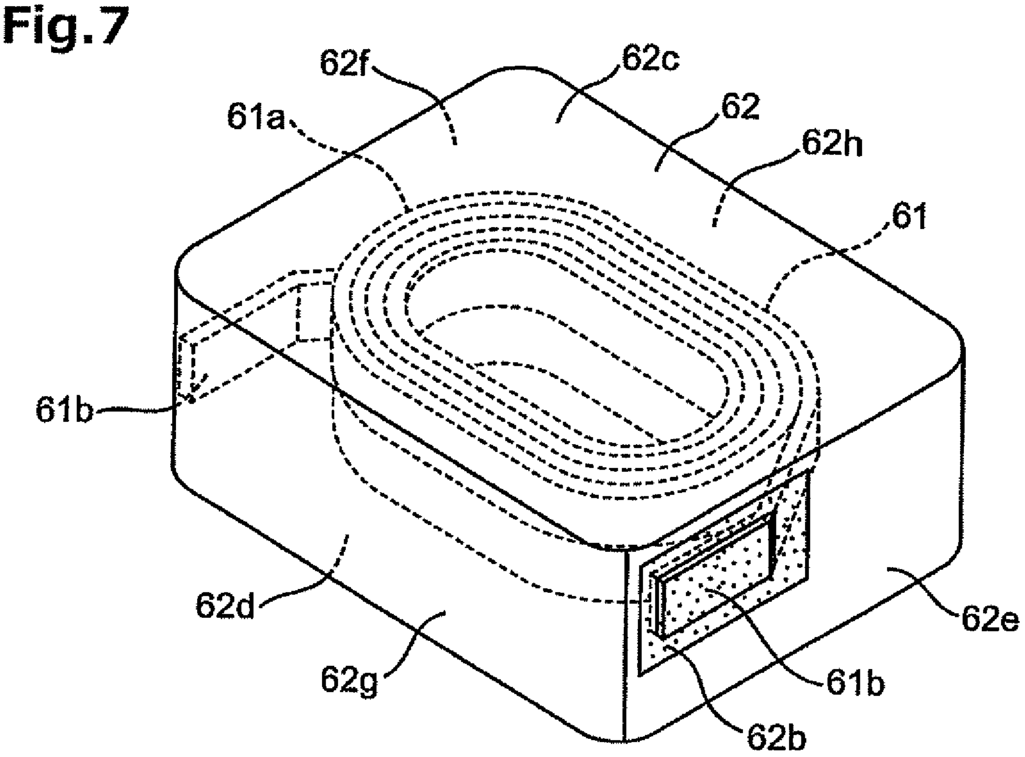
FIG. 7 is a schematic perspective view at a manufacturing step of a surface-mount inductor according to a second embodiment of the present disclosure.
Figure 8:
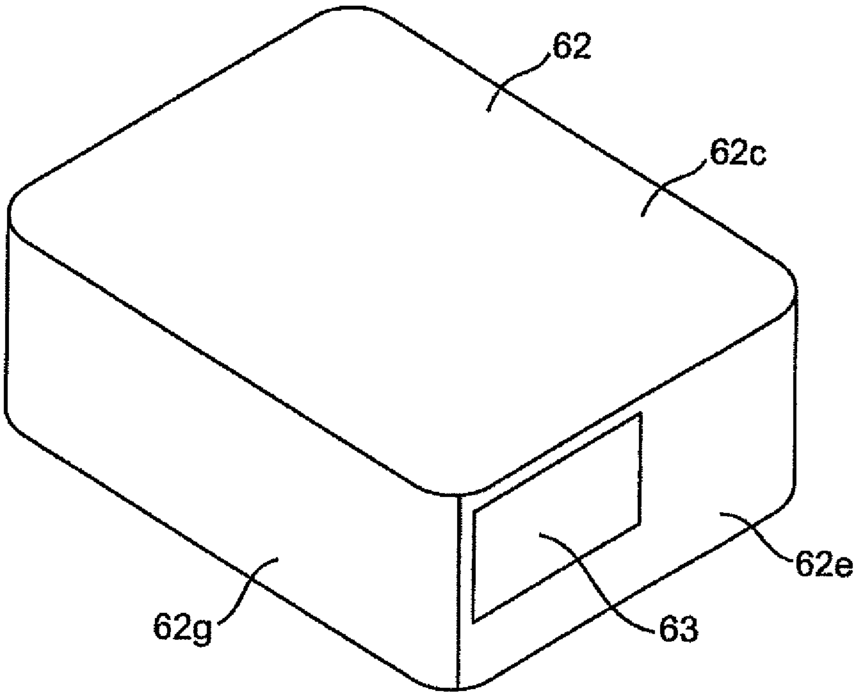
FIG. 8 is a schematic perspective view at a manufacturing step of the surface-mount inductor according to the second embodiment of the present disclosure.
Figure 9:
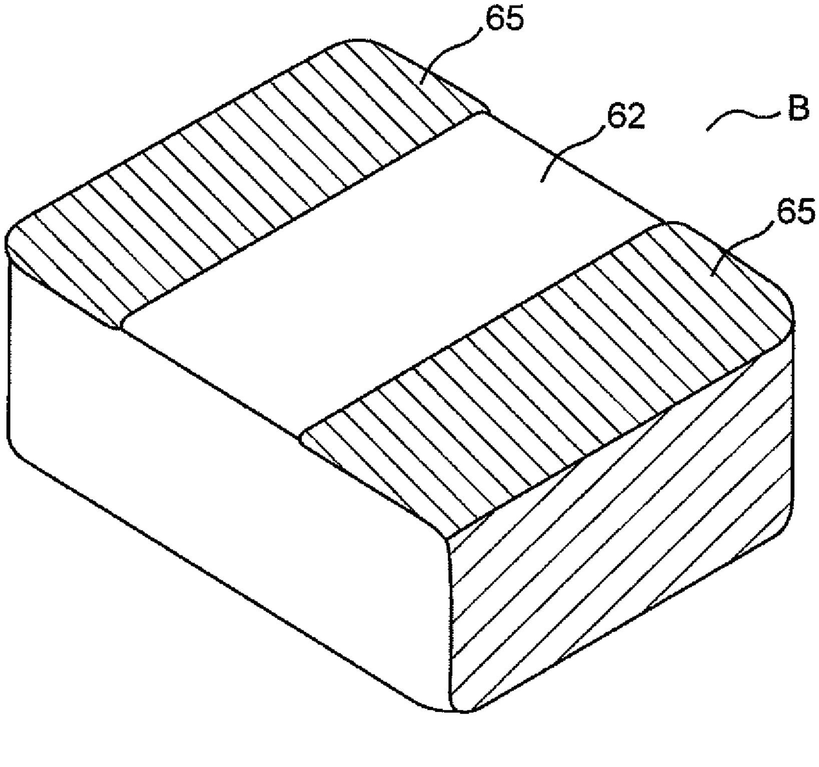
FIG. 9 is a schematic perspective view of the surface-mount inductor according to the second embodiment of the present disclosure.

FIG. 7 is a schematic perspective view at a manufacturing step of a surface-mount inductor B according to this embodiment. FIG. 8 is a schematic perspective view at a manufacturing step of the surface-mount inductor B. FIG. 9 is a schematic perspective view of the surface-mount inductor B.

As shown in FIG. 7, a molded body 62 has an upper surface 62*c* and a bottom surface 62*d* opposite to each other and four side surfaces 62*e*, 62*f*, 62*g*, 62*h* in direct contact with the upper surface 62*c* and the bottom surface 62*d*. The first side surface 62*e* and the second side surface 62*f* are side surfaces opposite in the length direction of the molded body 62 and have lead-out end parts 61*b*, 61*b* at both ends of the coil 61 exposed thereon. Metal magnetic powder exposed portions 62*b*, 62*b* are formed around the exposed surfaces of the lead-out end parts 61*b*, 61*b* at both ends.

As shown in FIG. 8, a plating layer 63 is formed over the exposed surface of the lead-out end part 61*b* of the coil 61 and the metal magnetic powder exposed portion 62*b*. As shown in FIG. 9, a conductive paste layer is formed into an L shape over the first side surface 62*e* and the bottom surface 62*d* to form an external terminal 65. A conductive paste layer is formed into an L shape over the second side surface 62*f* and the bottom surface 62*d* to form an external terminal 65. As a result, the lead-out end 61*b* and the external terminal 65 are connected.

According to this embodiment, the same effects as the first embodiment are obtained. Furthermore, since the resin components may be removed only around the exposed surfaces of the lead-out end parts, the workability of the external terminals can further be improved.

Third Embodiment

A surface-mount inductor according to this embodiment has the same structure as the first embodiment except using a plating layer having a mesh structure. Description will be made with reference to FIGS. 10A to 10B, and the portions common to the surface-mount inductor of the first embodiment will not be described.

Figure 10A:
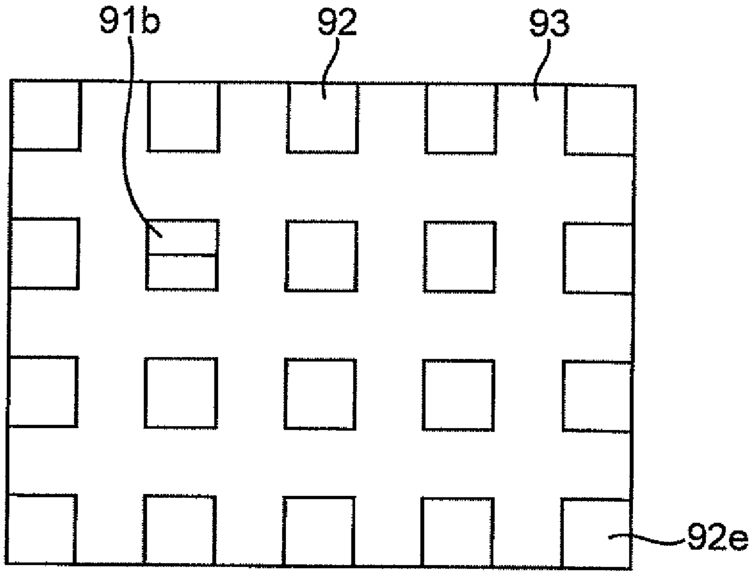
FIG. 10A is a schematic side view at a manufacturing step of a surface-mount inductor according to a third embodiment of the present disclosure.
Figure 10B:
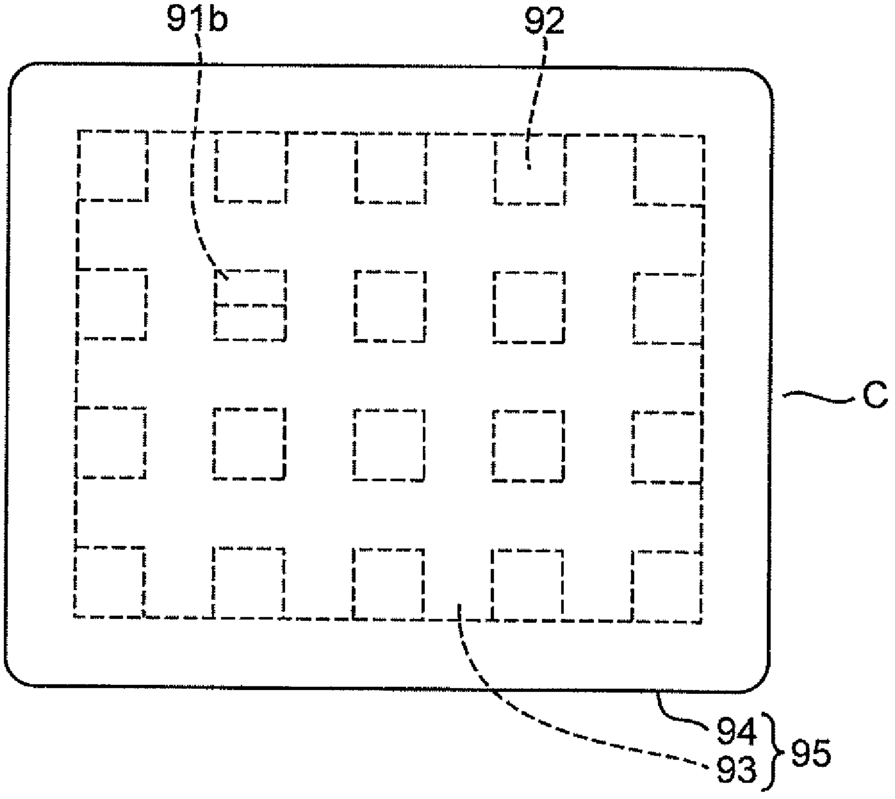
FIG. 10B is a transparent schematic side view of the surface-mount inductor according to the third embodiment of the present disclosure.

FIG. 10A is a schematic side view at a manufacturing step of a surface-mount inductor C according to this embodiment, showing a state before forming external terminals. FIG. 10B is a transparent schematic side view of the surface-mount inductor C.

As shown in FIG. 10A, a lead-out end part 91*b* is exposed on a first side surface 92*e* of a molded body 92. A plating layer 93 having a mesh structure is formed entirely on the first side surface 92*e*. As shown in FIG. 10B, a conductive paste layer 94 is formed to cover the plating layer 93. The conductive paste layer 94 is formed over the first side surface 92*e* and four surfaces adjacent to the first side surface 92*e*. As a result, the conductive paste layer 94 is bonded via the plating layer 93 to the lead-out end part 91*b*. The plating layer 93 having a mesh structure can be formed by removing the resin component on the surface of the first side surface 92*e* in a mesh shape by laser irradiation to form a metal magnetic material powder exposed portion having a mesh structure before performing a plating process. Although not shown, a plating layer having a mesh structure is also formed entirely on a second side surface opposite to the first side surface 92*e*, and a conductive paste layer is further formed on the plating layer over the second side surface and four surfaces adjacent to the second side surface.

According to this embodiment, the same effects as the first embodiment are obtained. Furthermore, the bonding strength between the molded body 92 and the external terminals 95 can further be improved by the anchor effect of the conductive paste 94 having entered gaps of the mesh structure of the plating layer 93.

Fourth Embodiment

A surface-mount inductor according to this embodiment has the same structure as the first embodiment except using a plating layer having a slit structure. Description will be made with reference to FIGS. 11A to 11B, and the portions common to the surface-mount inductor of the first embodiment will not be described.

Figure 11A:
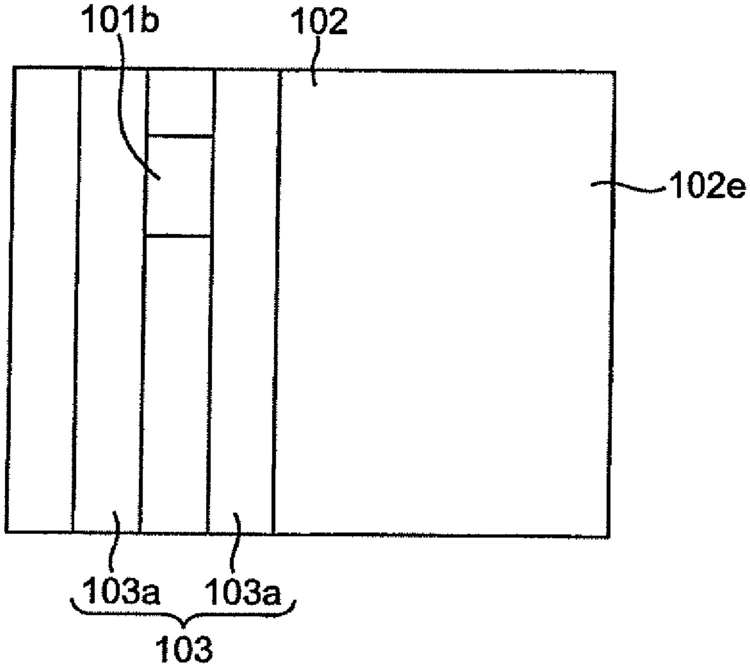
FIG. 11A is a schematic side view at a manufacturing step of a surface-mount inductor according to a fourth embodiment of the present disclosure.
Figure 11B:
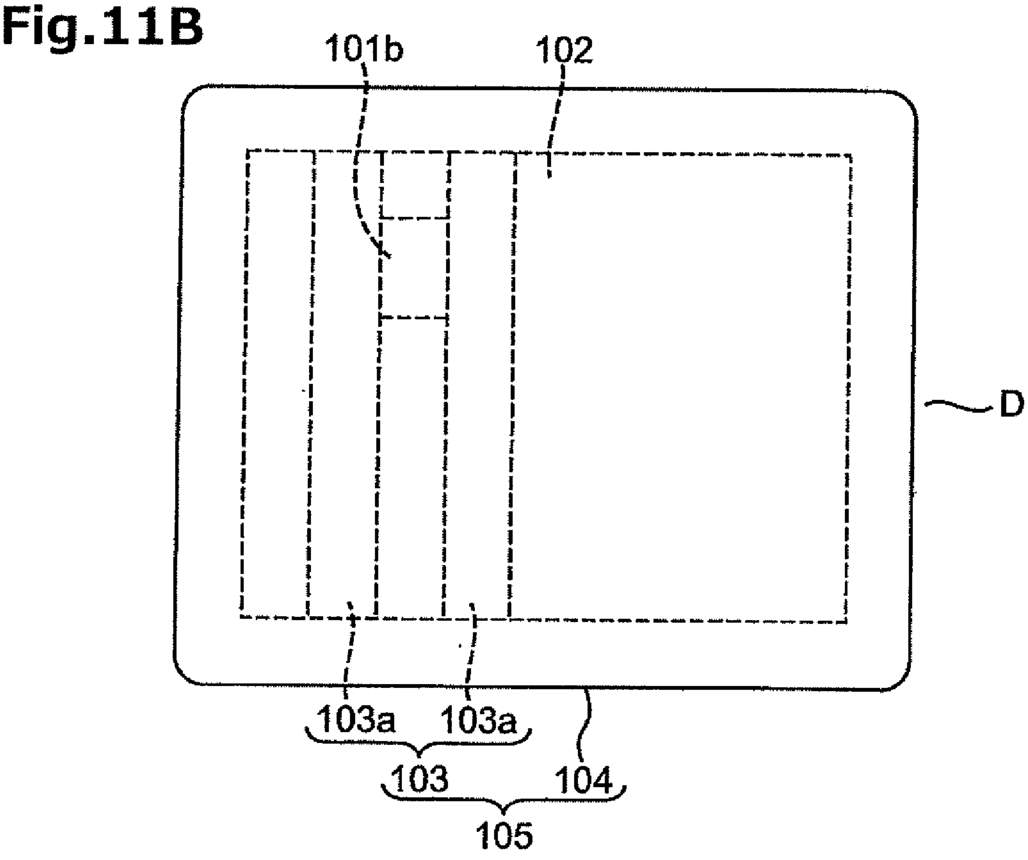
FIG. 11B is a transparent schematic side view of the surface-mount inductor according to the fourth embodiment of the present disclosure.

FIG. 11A is a schematic side view at a manufacturing step of a surface-mount inductor D according to this embodiment, showing a state before forming external terminals. FIG. 11B is a transparent schematic side view of the surface-mount inductor D.

As shown in FIG. 11A, a lead-out end part 101*b* is exposed on a first side surface 102*e* of a molded body 102. A plating layer 103 having a slit structure is formed entirely on the first side surface 102*e*. As shown in FIG. 11B, a conductive paste layer 104 is formed to cover the plating layer 103. The conductive paste layer 104 is formed over the first side surface 102*e* and four surfaces adjacent to the first side surface 102*e*. As a result, the conductive paste layer 104 is bonded via the plating layer 103 to the lead-out end part 101*b*. Regarding the plating layer 103 having a slit structure, the resin component on the surface of the first side surface 102*e* can be removed in a slit shape by laser irradiation to form multiple projecting metal magnetic material powder exposed portions extending in the lateral direction of the first side surface 102*e* before performing a plating process so as to form the plating layer 103 having multiple projecting platings 103*a* arranged in the lateral direction of the first side surface 102*e*. Although not shown, a plating layer having a slit structure is also formed entirely on a second side surface opposite to the first side surface 102*e*, and an external terminal is further formed on the plating layer over the second side surface and four surfaces adjacent to the second side surface.

According to this embodiment, the same effects as the first embodiment are obtained. Furthermore, the bonding strength between the molded body 102 and the external terminals 105 can further be improved by the anchor effect of the conductive paste having entered gaps of the slit structure of the plating layer 103.

Fifth Embodiment

A surface-mount inductor according to this embodiment has the same structure as the first embodiment except using a plating layer having a slit structure. Description will be made with reference to FIGS. 12A to 12B, and the portions common to the surface-mount inductor of the first embodiment will not be described.

Figure 12A:
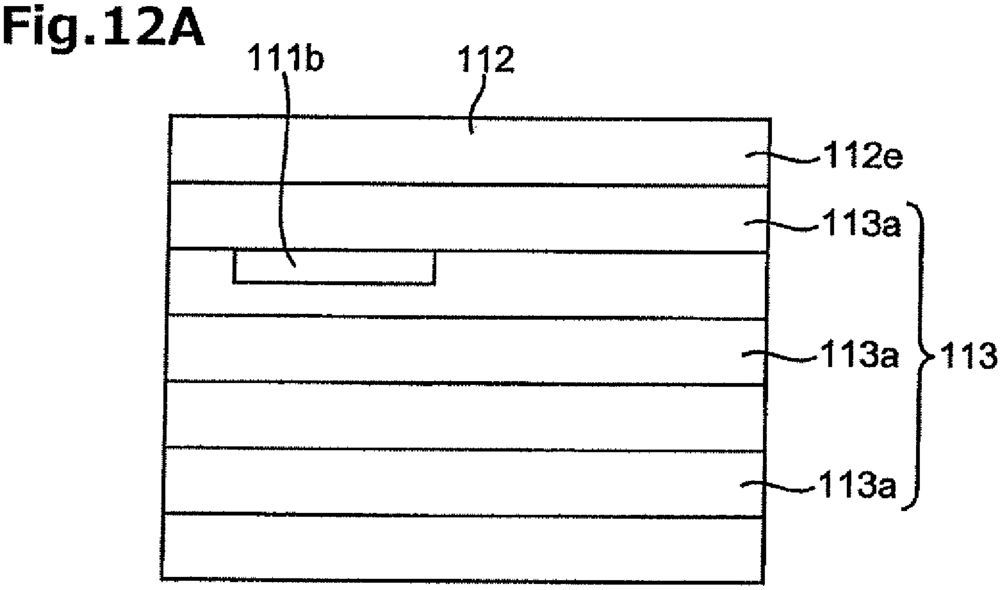
FIG. 12A is a schematic side view at a manufacturing step of a surface-mount inductor according to a fifth embodiment of the present disclosure.
Figure 12B:
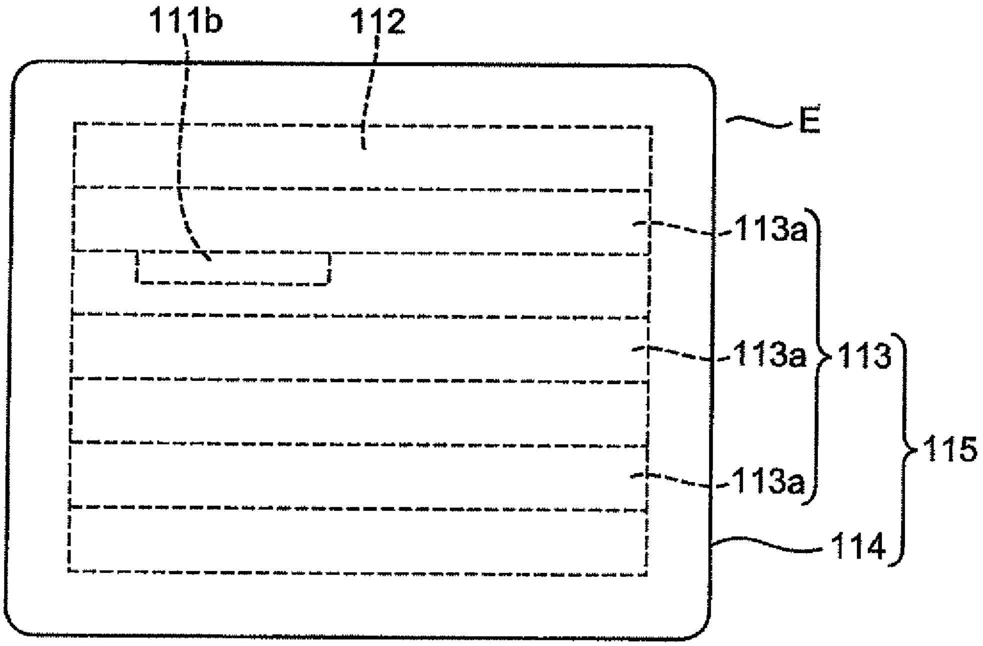
FIG. 12B is a transparent schematic side view of the surface-mount inductor according to the fifth embodiment of the present disclosure.

FIG. 12A is a schematic side view at a manufacturing step of a surface-mount inductor E according to this embodiment, showing a state before forming external terminals. FIG. 12B is a transparent schematic side view of the surface-mount inductor E.

As shown in FIG. 12A, a lead-out end part 111*b* is exposed on a first side surface 112*e* of a molded body 112. A plating layer 113 having a slit structure is formed entirely on the first side surface 112*e*. As shown in FIG. 12B, a conductive paste layer 114 is formed to cover the plating layer 113. The conductive paste layer 114 is formed over the first side surface 112*e* and four surfaces adjacent to the first side surface 112*e*. As a result, the conductive paste layer 114 is bonded via the plating layer 113 to the lead-out end part 111*b*. Regarding the plating layer 113 having a slit structure, the resin component on the surface of the first side surface 112*e* can be removed in a slit shape by laser irradiation to form multiple projecting metal magnetic material powder exposed portions extending in the lateral direction of the first side surface 112*e* before performing a plating process so as to form the plating layer 113 having multiple belt-shaped plating layers 113*a* arranged in the longitudinal direction of the first side surface 112*e*. Although not shown, a plating layer having a slit structure is also formed entirely on a second side surface opposite to the first side surface 112*e*, and a conductive paste layer is further formed on the plating layer over the second side surface and four surfaces adjacent to the second side surface.

According to this embodiment, the same effects as the first embodiment are obtained. Furthermore, the bonding strength between the molded body 112 and the external terminals 115 can further be improved by the anchor effect of the conductive paste 114 having entered gaps of the slit structure of the plating layer 113.

Sixth Embodiment

A surface-mount inductor according to this embodiment has the same structure as the first embodiment except that plating layers are formed in the longitudinal direction of a first side surface and a second side surface to at least partially overlap with exposed surfaces of lead-out end parts. Description will be made with reference to FIGS. 13A to 13B, and the portions common to the surface-mount inductor of the first embodiment will not be described.

Figure 13A:
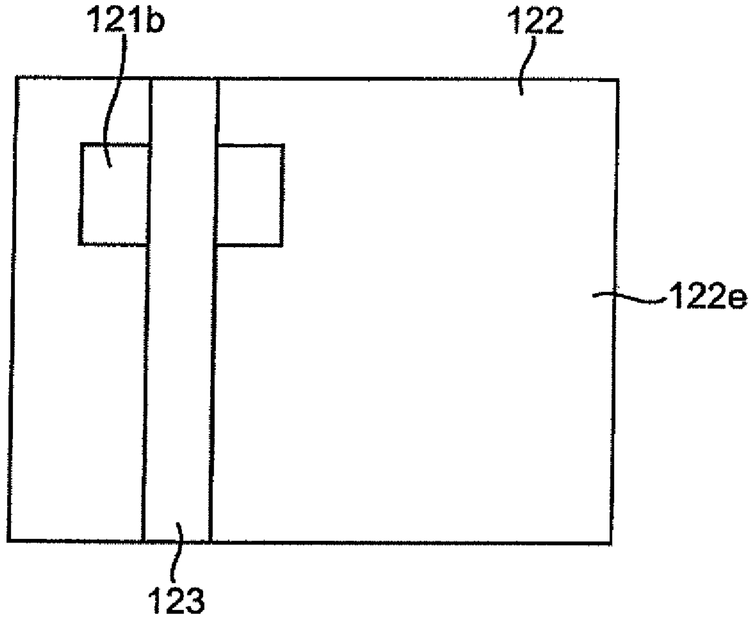
FIG. 13A is a schematic side view at a manufacturing step of a surface-mount inductor according to a sixth embodiment of the present disclosure.
Figure 13B:
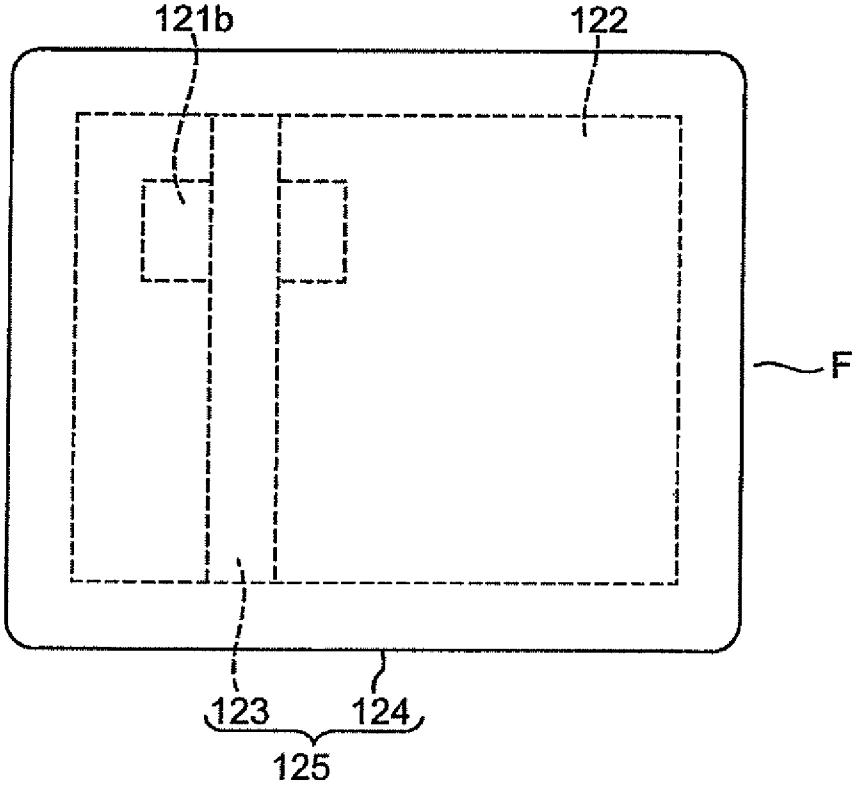
FIG. 13B is a transparent schematic side view of the surface-mount inductor according to the sixth embodiment of the present disclosure.

FIG. 13A is a schematic side view at a manufacturing step of a surface-mount inductor F according to this embodiment, showing a state before forming external terminals. FIG. 13B is a transparent schematic side view of the surface-mount inductor F.

As shown in FIG. 13A, a lead-out end part 121*b* is exposed on a first side surface 122*e* of a molded body 122. A plating layer 123 is formed in the longitudinal direction of the first side surface 122*e* to overlap with a substantially central portion of an exposed surface of the lead-out end part 121*b*. As shown in FIG. 13B, a conductive paste layer 124 is formed to cover the plating layer 123. The conductive paste layer 124 is formed over the first side surface 122*e* and four surfaces adjacent to the first side surface 122*e*. As a result, the conductive paste layer 124 is bonded via the plating layer 123 to the lead-out end part 121*b*. Although not shown, a plating layer is also formed on a second side surface opposite to the first side surface 112*e* in the longitudinal direction of the second side surface to overlap with a substantially central portion of an exposed surface of a lead-out end part, and an external terminal is further formed on the plating layer over the second side surface and four surfaces adjacent to the second side surface. Although FIGS. 13A and 13B show an example of the plating layer 123 formed in the longitudinal direction of the first side surface 122*e* to overlap with the substantially central portion of the exposed surface of the lead-out end part 121*b*, the plating layer 123 may overlap at least partially with the exposed surface of the lead-out end part 121*b*.

According to this embodiment, the same effects as the first embodiment are obtained. Furthermore, the bonding strength between the plating layers and the lead-out end parts can be improved by forming the plating layers directly on the exposed surfaces of the lead-out end parts.

Seventh Embodiment

A surface-mount inductor according to this embodiment has the same structure as the first embodiment except that an external terminal includes a first plating layer, a conductive paste layer, and a second plating layer formed on the conductive paste layer while the conductive layer has a conductive-paste-layer non-formation region with the first plating layer and the second plating layer directly bonded in the conductive-paste-layer non-formation region. Description will be made with reference to FIG. 14, and the portions common to the surface-mount inductor of the first embodiment will not be described.

Figure 14:
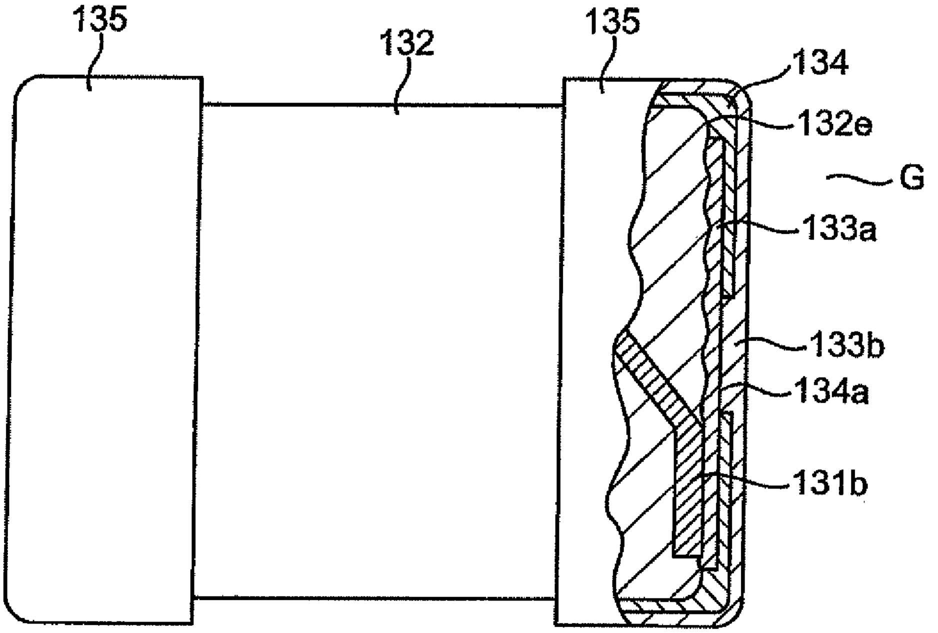
FIG. 14 is a partially cutaway schematic cross-sectional view of a surface-mount inductor according to a seventh embodiment of the present disclosure.

FIG. 14 is a partially cutaway schematic cross-sectional view of a surface-mount inductor G according to this embodiment. A lead-out end part 131*b* is exposed on a first side surface 132*e* of a molded body 132. An external terminal 135 includes a first plating layer 133*a*, a conductive paste layer 134, and a second plating layer 133*b*. The first plating layer 133*a* is formed on the lead-out end part 131*b*, the conductive paste layer 134 having one conductive-paste-layer non-formation region 134*a* is formed on the first plating layer 133*a*, and the second plating layer 133*b* is formed on the conductive paste layer 134 to cover the conductive paste layer 134. The first plating layer 133*a* and the second plating layer 133*b* are directly bonded in the conductive-paste-layer non-formation region 134*a* disposed in a substantially central portion of the first plating layer 133*a*. The first plating layer 133*a* is formed entirely on the first side surface 132*e*. The conductive paste layer 134 is formed over the first side surface 132*e* and four surfaces adjacent to the first side surface 132*e*. Although a metal material such as Cu, Ni, and Sn can be used for the plating layer, it is preferable to use Cu for the first plating layer and Ni for the second plating layer. Although not shown, also on a second side surface opposite to the first side surface 132*e*, an external terminal includes a first plating layer, a conductive paste layer, and a second plating layer formed on the conductive paste layer, and the conductive paste layer has one conductive-paste-layer non-formation region with the first plating layer and the second plating layer directly bonded in the conductive-paste-layer non-formation region. The conductive-paste-layer non-formation region can be formed by application through a predetermined mask pattern. For the conductive-paste-layer non-formation region, a belt-shaped region extending in the lateral direction of the first plating layer 133*a* can be used.

According to this embodiment, the same effects as the first embodiment are obtained. Furthermore, by sandwiching the conductive paste layer between the first plating layer and the second plating layer and directly bonding the first plating layer and the second plating layer in the conductive-paste-layer non-formation region, the adhesion of the conductive paste layer to the molded body can be improved, and the connection reliability can also be improved.

In the example described in this embodiment, as shown in FIG. 14, the first plating layer 133*a* is formed substantially entirely on the first side surface 132*e*; however, the plating layers having the mesh or slit structure described in the third to fifth embodiments are also usable. Even in this case, the same effects as this embodiment are produced.

In the example described in this embodiment, as shown in FIG. 14, the first plating layer 133*a* is formed substantially entirely on the first side surface 132*e*; however, the entire surface of the first plating layer 133*a* can completely be exposed, while a conductive paste layer is formed such that the conductive paste layer covers the first plating layer 133*a* of the first side surface in the periphery thereof, and the second plating layer can be formed on the conductive paste layer to directly bond the first plating layer and the second plating layer. Even in this case, the same effects as this embodiment are produced.

Eighth Embodiment

A surface-mount inductor according to this embodiment has the same structure as the seventh embodiment except that a conductive paste layer has multiple conductive-paste-layer non-formation regions with a first plating layer and a second plating layer directly bonded in the multiple conductive-paste-layer non-formation regions.

Figure 15:
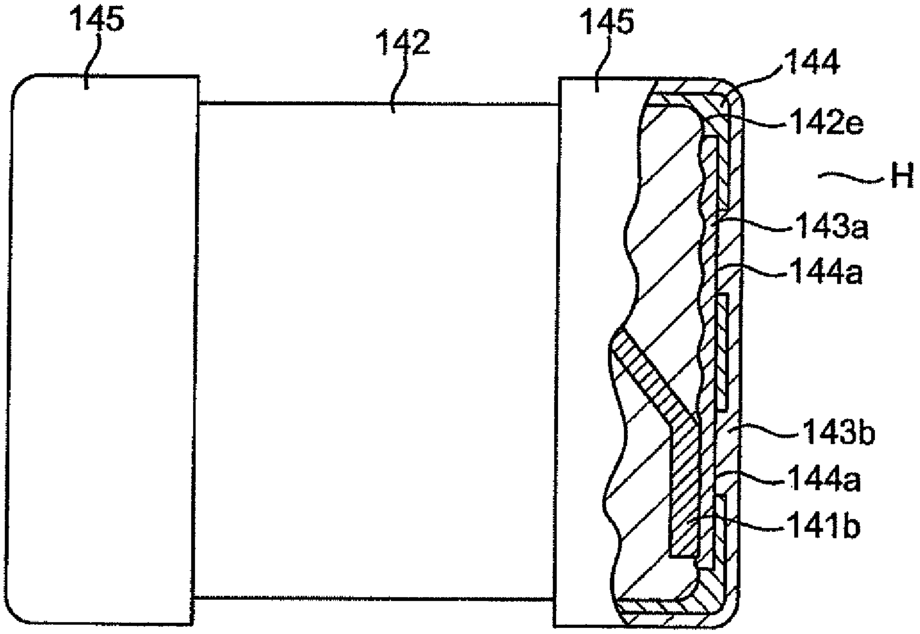
FIG. 15 is a partially cutaway schematic cross-sectional view of a surface-mount inductor according to an eighth embodiment of the present disclosure.

FIG. 15 is a partially cutaway schematic cross-sectional view of a surface-mount inductor H according to this embodiment. A lead-out end part 141*b* is exposed on a first side surface 142*e* of a molded body 142. An external terminal 145 includes a first plating layer 143*a*, a conductive paste layer 144, and a second plating layer 143*b*. The first plating layer 143*a* is formed on the lead-out end part 141*b*, the conductive paste layer 144 having multiple conductive-paste-layer non-formation regions 144*a* is formed on the first plating layer 143*a*, and the second plating layer 143*b* is formed on the conductive paste layer 144 to cover the conductive paste layer 144. The first plating layer 143*a* and the second plating layer 143*b* are directly bonded in the multiple conductive-paste-layer non-formation regions 144*a* arranged in the longitudinal direction of the first plating layer 143*a*. For each of the conductive-paste-layer non-formation region, a belt-shaped region extending in the lateral direction of the first plating layer 143*a* can be used.

According to this embodiment, the same effects as the seventh embodiment are obtained. Furthermore, since the first plating layer and the second plating layer are directly bonded in the multiple conductive-paste-layer non-formation regions, the adhesion of the conductive paste layer to the molded body can further be improved, and the connection reliability can also be improved.

In the example described in this embodiment, as shown in FIG. 15, the first plating layer 143*a* is formed substantially entirely on the first side surface 142*e*; however, the plating layers having the mesh or slit structure described in the third to fifth embodiments are also usable. Even in this case, the same effects as this embodiment are produced.

In the example described in this embodiment, as shown in FIG. 15, the first plating layer 143*a* is formed substantially entirely on the first side surface 142*e*; however, the entire surface of the first plating layer 143*a* can completely be exposed, while a conductive paste layer is formed such that the conductive paste layer covers the first plating layer 143*a* of the first side surface in the periphery thereof, and the second plating layer can be formed on the conductive paste layer to directly bond the first plating layer and the second plating layer. Even in this case, the same effects as this embodiment are produced.

Ninth Embodiment

A surface-mount inductor according to this embodiment has the same structure as the first embodiment except that a conductive paste layer is formed on an upper edge portion and a lower edge portion of a plating layer and on four surfaces adjacent to a first side surface. Description will be made with reference to FIG. 16, and the portions common to the surface-mount inductor of the first embodiment will not be described.

Figure 16:
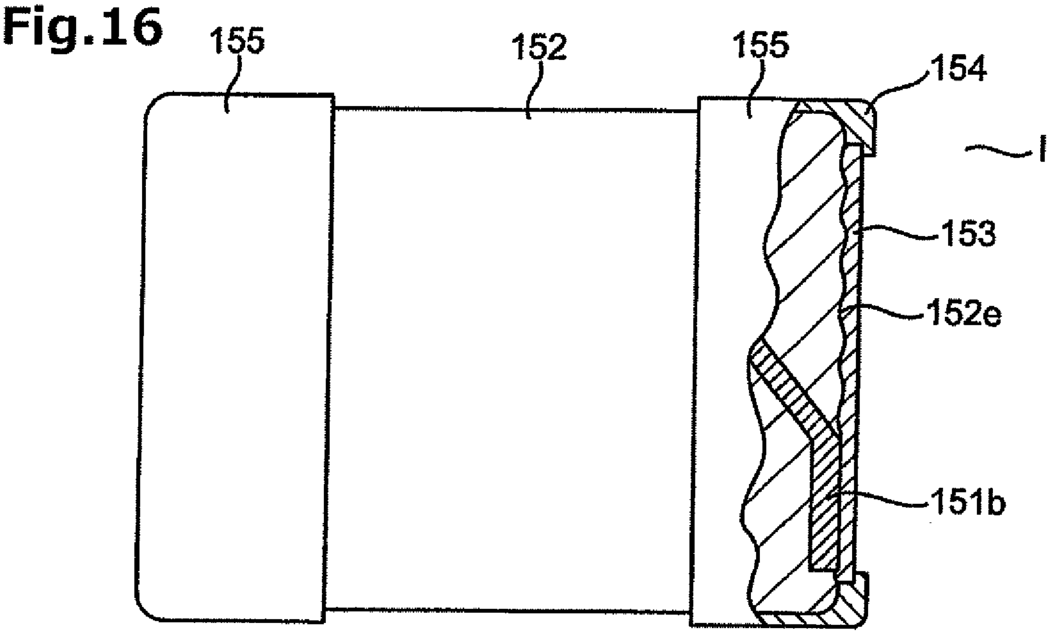
FIG. 16 is a partially cutaway schematic cross-sectional view of a surface-mount inductor according to a ninth embodiment of the present disclosure.

FIG. 16 is a partially cutaway schematic cross-sectional view of a surface-mount inductor I according to this embodiment. A lead-out end part 151*b* is exposed on a first side surface 152*e* of a molded body 152. A plating layer 153 is formed on the lead-out end part 151*b*. A conductive paste layer 154 is formed on an upper edge portion and a lower edge portion of the plating layer 153 and on four surfaces adjacent to the first side surface.

According to this embodiment, the same effects as the first embodiment are obtained. Furthermore, since the conductive paste layer is formed on the upper edge portion and the lower edge portion of the plating layer instead of the entire surface of the plating layer, an amount of the expensive conductive paste used can be reduced.

Tenth Embodiment

A surface-mount inductor according to this embodiment has the same structure as the first embodiment except that a bent portion is formed by leading out a lead-out end part of a coil from a first side surface and bending a tip portion led out into contact with a metal magnetic material powder exposed portion formed on the first side surface, and that while the lead-out end part is fixed to a molded body by the bent portion, the insulating coating of the bent portion is removed to form a plating layer.

According to this embodiment, the same effects as the seventh embodiment are obtained. Furthermore, by forming the plating layer on the bent portion, the bonding area is increased, and the bonding strength can further be improved. Additionally, as compared to when the lead-out end part of the coil is exposed on the first side surface, a tolerance becomes larger in terms of arrangement of the lead-out end part at the time of manufacturing of the molded body, so that an effect of facilitating the manufacturing of the molded body is also obtained.

In the surface-mount inductors according to the second to ninth embodiments, the lead-out end part of the coil can be led out from the first side surface to form the bent portion. Even in this case, the same effects as this embodiment are produced.

Eleventh Embodiment

Figure 17:
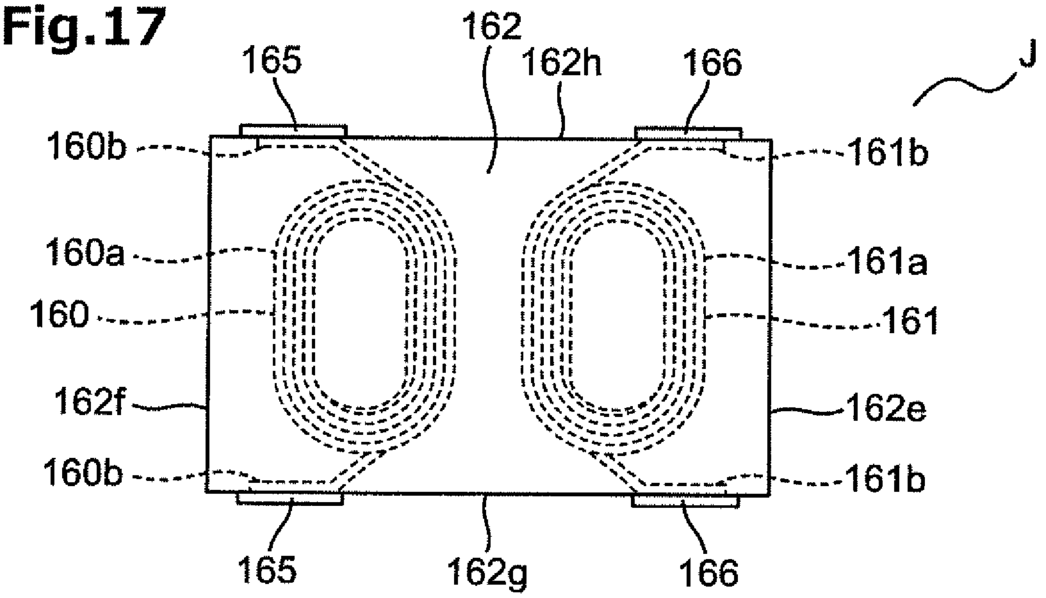
FIG. 17 is a transparent schematic top view of a surface-mount inductor according to an eleventh embodiment of the present disclosure.
Figure 18:
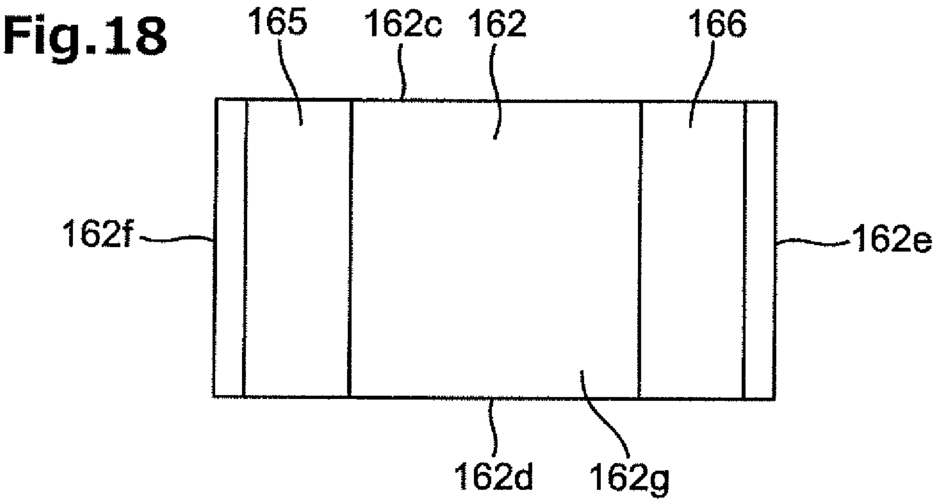
FIG. 18 is a schematic side view of the surface-mount inductor according to the eleventh embodiment of the present disclosure.
Figure 19:
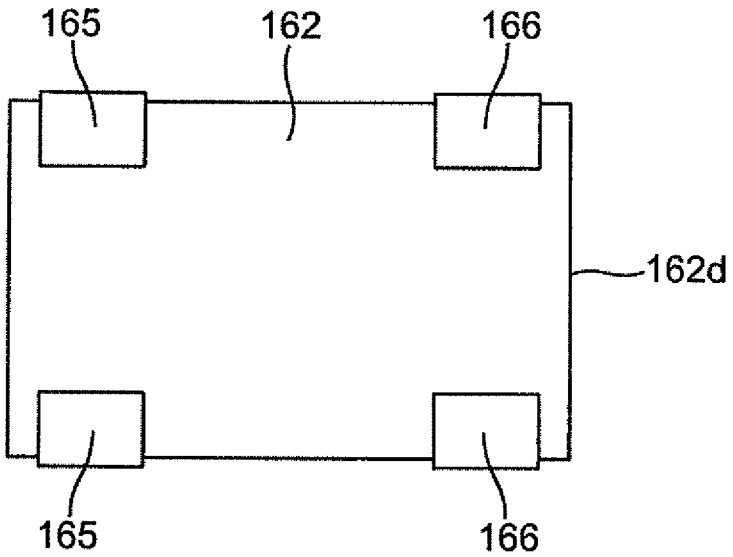
FIG. 19 is a schematic bottom view of the surface-mount inductor according to the eleventh embodiment of the present disclosure.
Figure 20:
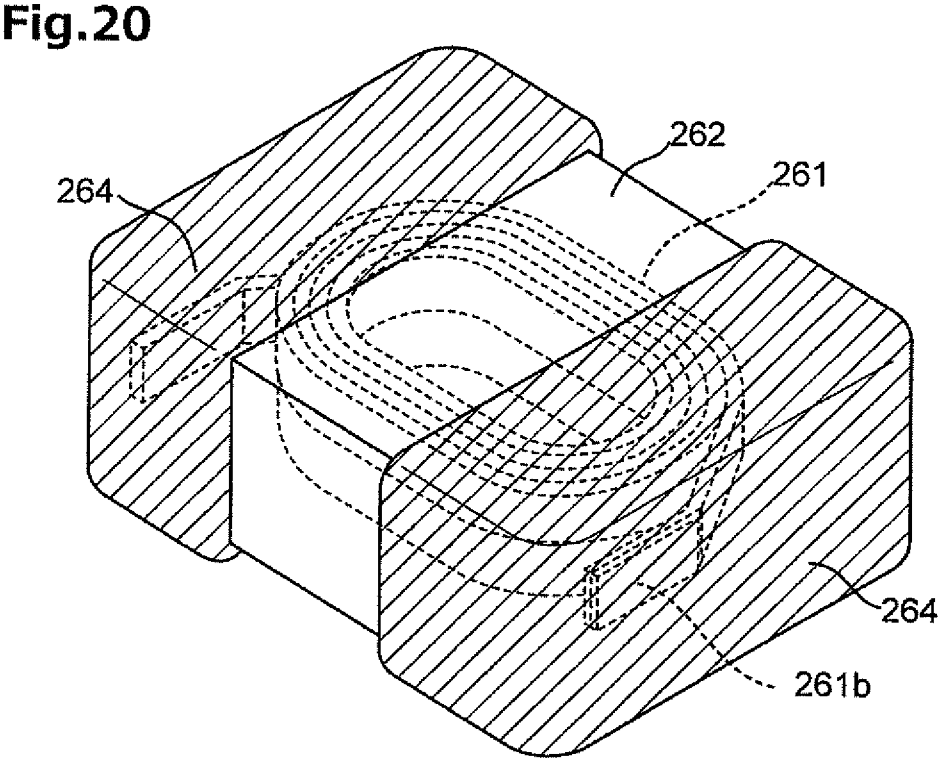
FIG. 20 is a transparent schematic perspective view of a conventional surface-mount inductor.

This embodiment is an example of a surface-mount inductor J having two coils embedded in a molded body. FIGS. 17, 18, and 19 show a transparent schematic top view, a schematic side view, and a schematic bottom view, respectively, of the surface-mount inductor J.

In a molded body 162, two coils 160, 161 formed by winding conductive wires are buried in the length direction of the molded body 162. The one coil 160 is a coil including a winding part 160*a* in which a conductive wire is wound such that both ends are arranged in directions opposite to each other along an outer circumferential surface of the coil, and a pair of lead-out end parts 160*b*, 160*b* disposed at both ends of the winding part 160*a* and made up of non-winding portions. Similarly, the other coil 161 includes a winding part 161*a* and a pair of lead-out end parts 161*b*, 161*b* disposed at both ends of the winding part 161*a* and made up of non-winding portions. FIG. 17 shows an example of two-tier outside-to-outside winding. The length direction of the molded body in this embodiment refers to a direction of extension of a straight line orthogonally intersecting with a straight line connecting the lead-out end parts at both ends of the coil.

On a third side surface 162*g* and a fourth side surface 162*h* oppositely arranged in the width direction of the molded body 162, a pair of lead-out end parts 160*b*, 160*b* of the coil 160 is respectively exposed, while a pair of lead-out end parts 161*b*, 161*b* is also exposed. Plating layers (not shown) are respectively formed over the exposed surfaces of the lead-out end parts 160*b*, 160*b* and portions of the third side surface 162*g* and the fourth side surface 162*h*. On the plating layers, a pair of conductive paste layers (not shown) made of a solidified conductive paste is formed, extending in a belt shape on an upper surface 162*c* and side surfaces 162*g*, 162*h* and reaching a bottom surface 162*d* of the molded body 162. Similarly, plating layers (not shown) are respectively formed over the exposed surfaces of the lead-out end parts 161*b*, 161*b* and portions of the third side surface 162*g* and the fourth side surface 162*h*. On the plating layers, a pair of conductive paste layers (not shown) made of a solidified conductive paste is formed, extending in a belt shape on the upper surface 162*c* and the side surfaces 162*g*, 162*h* and reaching the bottom surface 162*d* of the molded body 162. As a result, the lead-out end parts 160*b*, 160*b* at both ends of the coil 160 are respectively connected via the plating layers to the pair of conductive paste layers. The plating layers and the conductive paste layers constitute a pair of external terminals 165, 165. Similarly, the lead-out end parts 161*b*, 161*b* at both ends of the coil 161 are respectively connected via the plating layers to the pair of conductive paste layers, and the plating layers and the conductive paste layers constitute a pair of external terminals 166, 166. In this embodiment, the third side surface 162*g* and the fourth side surface 162*h* mean opposite side surfaces with which a straight line connecting the lead-out end parts at both ends of the coil intersects.

According to this embodiment, even when two coils are used, the surface-mount inductor having the external terminals with high connection reliability can be provided.

What is claimed is:

1. A manufacturing method of a surface-mount inductor having at least one coil buried in a molded body containing a metal magnetic powder, the method comprising:

molding by placing the at least one coil in a molding die and filling a material for a molded body into the molding die to obtain the molded body, wherein the coil is buried in the molded body such that lead-out end parts at both ends of the coil are at least partially exposed on a surface of the molded body;

forming an external terminal over an exposed surface of each of the lead-out end parts and a metal magnetic powder exposed portion formed at least around the exposed surface, the forming the external terminal at least including forming a first plating layer over the metal magnetic powder exposed portion and the exposed surface of the lead-out end part; and forming a conductive layer on the first plating layer by applying a conductive paste on the first plating layer and performing a heat treatment to dry and solidify the conductive paste, wherein the forming the external terminal includes forming a second plating layer on the conductive layer, and wherein one or more conductive layer non-formation regions are formed in the conductive layer to directly bond the first plating layer and the second plating layer in the one or more conductive layer non-formation regions.

2. The manufacturing method according to claim 1, wherein:

the molded body has a rectangular parallelepiped shape having upper and bottom surfaces opposite to each other and four side surfaces, and during the molding, the molded body is molded such that the lead-out end parts at both ends are respectively exposed on first and second side surfaces opposite to each other.

3. The manufacturing method according to claim 2, wherein the metal magnetic powder exposed portion is formed entirely on the first side surface and the second side surface other than the exposed surfaces of the lead-out end parts.

4. The manufacturing method according to claim 2, wherein during the forming the first plating layer, the first plating layer having a mesh structure is formed.

5. The manufacturing method according to claim 1, wherein during the forming the first plating layer, the first plating layer having a mesh structure is formed.

6. The manufacturing method according to claim 1, wherein during the forming the first plating layer, the first plating layer having a slit structure is formed.

7. A manufacturing method of a surface-mount inductor having at least one coil buried in a molded body containing a metal magnetic powder, the method comprising:

molding by placing the at least one coil in a molding die and filling a material for a molded body into the molding die to obtain the molded body, wherein the coil is buried in the molded body such that lead-out end parts at both ends of the coil are at least partially exposed on a surface of the molded body;

forming an external terminal over an exposed surface of each of the lead-out end parts and a metal magnetic powder exposed portion formed at least around the exposed surface, the forming the external terminal at least including forming a first plating layer over the metal magnetic powder exposed portion and the exposed surface of the lead-out end part; and forming a conductive paste layer made of a solidified conductive paste on the first plating layer, wherein the forming the external terminal includes forming a second plating layer on the conductive paste layer, and wherein one or more conductive-paste-layer non-formation regions are formed in the conductive paste layer to directly bond the first plating layer and the second plating layer in the one or more conductive-paste-layer non-formation regions.

8. The manufacturing method according to claim 7, wherein:

the molded body has a rectangular parallelepiped shape having upper and bottom surfaces opposite to each other and four side surfaces, and during the molding, the molded body is molded such that the lead-out end parts at both ends are respectively exposed on first and second side surfaces opposite to each other.

9. The manufacturing method according to claim 8, wherein the metal magnetic powder exposed portion is formed entirely on the first side surface and the second side surface other than the exposed surfaces of the lead-out end parts.

10. The manufacturing method according to claim 7, wherein during the forming the first plating layer, the first plating layer having a mesh structure is formed.

11. The manufacturing method according to claim 7, wherein during the forming the first plating layer, the first plating layer having a slit structure is formed.

12. The manufacturing method according to claim 8, wherein during the forming the first plating layer, the first plating layer having a mesh structure is formed.

* * * * *